May 16, 1972   D. E. NETTLETON, JR., ET AL   3,663,691
KUNDRYMYCIN AND PROCESS FOR ITS PRODUCTION
Filed Sept. 3, 1970                              2 Sheets-Sheet 2

STREPTOMYCES METACHROMOGENES

CARVAJAL'S OATMEAL   12 DAYS  28°C
                    21 DAYS  10°C

SCOPE MAG = 10,000X    PRINT MAG = 26,000X

WILLIAM T. BRADNER
JAMES A. BUSH
DONALD E. NETTLETON JR.
                INVENTOR.

BY James Magee Jr.
   attorney

United States Patent Office 3,663,691
Patented May 16, 1972

3,663,691
KUNDRYMYCIN AND PROCESS FOR ITS PRODUCTION
Donald E. Nettleton, Jr., Jordan, James A. Bush, Fayetteville, and William T. Bradner, Manlius, N.Y., assignors to Bristol-Myers Company, New York, N.Y.
Filed Sept. 3, 1970, Ser. No. 69,220
Int. Cl. A61k 21/00
U.S. Cl. 424—121                                3 Claims

ABSTRACT OF THE DISCLOSURE

The specification discloses a new chemical substance referred to as kundrymycin and a process for production thereof by fermentation of a kundrymycin-producing strain of Streptomyces, designated *Streptomyces metachromogenes*. Kundrymycin is shown to have antibiotic activity and antitumor properties against certain transplanted mouse tumors and Walker 256 carcinosarcoma.

BACKGROUND OF THE INVENTION

This invention is directed to a heretofore unknown chemical substance hereafter identified as kundrymycin and to a process for preparing kundrymycin by fermentation of a new species of Streptomyces designated as *Streptomyces metachromogenes*. This organism was isolated from a soil sample collected in Michigan. A high-yield producing variant of this organism has been deposited with the American Type Culture Collection, Rockville, Md., as ATCC 21,440. The high-yield producing variant (ATCC 21,440) is referred to herein as variant 8, and the parent strain is referred to as C–35,101.

Kundrymycin is produced by cultivating a kundrymycin-producing strain of Streptomyces, e.g., C–35,101, in an aqueous carbohydrate medium containing a nitrogenous nutrient under submerged aerobic conditions. The development and production of kundrymycin can be followed by measuring the activity of the liquid phase against animal tumors or by colorimetrically measuring the amount of kundrymycin in the broth. When a substantial concentration is attained, kundrymycin can be recovered from the aqueous phase by conventional technique known in the fermentation art.

The antibiotic of this invention is also produced by a number of variants of parent strain C–35,101. In general, the properties of the variant strains and the parent are essentially identical except for minor charateceristics such as color.

Figure 2:
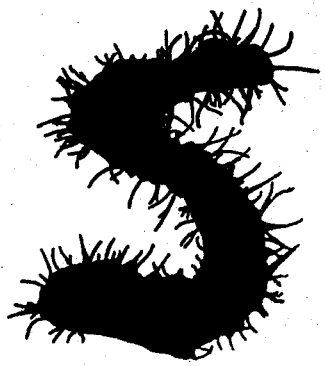

Inocula of the microorganism for the study of *Streptomyces metachromogenes* strain C–35,101 and variant 8 were prepared according to known procedures. (Gottlieb, Appl. Microbiol., 9:55–65, 1961). On solid media, the organisms characteristically exhibit yellowish-brown to yellowish-gray aerial mycelium. The spores form chains of about ten or more spores arranged in open and closed spirals. The spores which have a hairy or spiny spore surface and dimensions of about 0.71 by 1.4 to 2.1 microns are illustrated in FIG. 2.

Growth characteristics for culture of *Streptomyces metachromogenes* strain C–35,101 and variant 8 incubated at 28° C. for fourteen days on agar media in a cross-hatched pattern are set forth below. The color names correspond to those in "A Dictionary of Color," Maerz et al., Second Edition, McGraw-Hill Book Company, New York, 1950. The names refer to specific color chips. The ISCC–NBS color names and numbers are also given in parentheses.

TABLE I

Cultural characteristics of *Streptomyces metachromogenes* sp. n. strain C–35,101

| Medium | | Description |
|---|---|---|
| Yeast extract agar | Aerial mycelium | Abundant, floccose, spores in spirals, GRAVEL plate 13 A–4 (light grayish yellowish brown #79) to FLESH plate 11 A–2 (yellowish gray #93). |
| | Vegetative mycelium | Reddish tan. |
| | Reverse | CLAY plate 13 J–8 (moderate yellowish brown #77). |
| | Soluble pigment | None. |
| Carvajal's oatmeal agar. | Aerial mycelium | Abundant, floccose, spores in spirals, ATMOSPHERE plate 12 A–3 (light grayish yellowish brown #79) to PIPING ROCK plate 13 A–2 (light olive gray #112). |
| | Vegetative mycelium | Orange. |
| | Reverse | FEUILLE MORTE plate 5 A–12 (brownish orange #54) reddish purple with 0.05 N NaOH, no change with 0.05 N HCl. |
| | Soluble pigment | Faint yellowish orange, no change with 0.05N HCl, faint yellowish purple with 0.05 N NaOH. |
| Glycerol asparagine agar. | Aerial mycelium | Scant, spores in spirals, TRAP ROCK plate 15 A–2 (dark gray #266). |
| | Vegetative mycelium | Rust brown. |
| | Reverse | ROSE BEIGE 2 plate 5 A–10 (light brown #57), no change with 0.05 N HCl, grayish violet with 0.05 N NaOH. |
| | Soluble pigment | A trace of pink, no change with 0.05 N HCl or 0.05 N NaOH. |
| Inorganic salts-starch agar. | Aerial mycelium | Moderate, fluoccose, spores in spirals BISQUE plate 11 A–3 (yellowish gray #93). |
| | Vegetative mycelium | Red-brown. |
| | Reverse | PHEASANT plate 4 B–11 (moderate orange #53), no change with 0.05 N HCl, violet with 0.05 N NaOH. |
| | Soluble pigment | Trace of pink. |

TABLE II

Cultural characteristics of *Streptomyces metachromogenes* sp n., High-kundrymycin-producing variant 8

| Medium | | Description |
|---|---|---|
| Yeast extract agar | Aerial mycellium | Abundant velvety, spores in spirals BEAVER plate 15 A–6 (Brownish gray #64). |
| | Vegetative mycellium | Not exposed. |
| | Reverse | PICCADILLY plate 7 H–10 (grayish reddish brown #46) orange brown with 0.05 N HCl, purple brown with 0.05 N NaOH. |
| | Soluble pigment | Light brown. |

TABLE II—Continued

| Medium | Description | |
|---|---|---|
| Carvajal's oatmeal agar. | Aerial mycelium | Abundant velvety, spores in spirals ATMOSPHERE plate 12 A-3 (light grayish yellowish brown #79). |
| | Vegetative mycelium | Dark orange. |
| | Reverse | GYPSY plate 6 B-12 (strong brown #55) no change with 0.05 N HCl, dark purple with 0.05 N NaOH. |
| | Soluble pigment | Yellowish orange, no change with 0.05 N HCl, purple with 0.05 N NaOH. |
| Glycerol asparagine | Aerial mycelium | None. |
| | Vegetative mycelium | Dark red brown. |
| | Reverse | VASSAR TAN plate 6 A-11 (strong brown #55), no change with 0.05 N HCl, purple with 0.05 N NaOH. |
| | Soluble pigment | Light pink, no change with 0.05 N HCl, faint violet pink with 0.05 N NaOH. |
| Inorganic salts-starch agar. | Aerial mycelium | Moderate floccose, spores in spirals, BISQUE plate 11 A-3 (yellowish gray #93). |
| | Vegetative mycelium | Dark reddish brown. |
| | Reverse | MEXICO plate 5 D-11 (moderate reddish brown #43), no change with 0.05 N HCl, purple with 0.05 N NaOH. |
| | Soluble pigment | Faint pink. |

Yeast extract agar, Carvajal's oatmeal agar, and inorganic salts-starch agar referred to in the above tables are described by Pridham et al., Antibiotic Ann., 1956/1957: 947–953, 1957 and the glycerol asparagine agar is described by Pridham et al., J. Bacteriol., 81:431–441, 1961.

*Streptomyces metachromogenes* (ATCC 21,440) utilizes D-glucose, D-fructose, D-mannitol, D-xylose, rhamnose, sucrose, L-arabinose, raffinose, and i-inositol when tested by the procedure of Pridham et al., J. Bacteriol., 56:107–114, 1948. Starch is hydrolyzed in inorganic salts-starch agar. (See Pridham et al., Antibiot. Ann., 1956/1957:947–953, 1957.)

Hydrogen sulfide is produced in peptone iron agar (Difco Laboratories, Detroit, Mich.) plus 0.1% yeast extract (Baltimore Biological Laboratory, Baltimore, Md.). Melanin-like pigment is produced in that medium as well as in Tryptone yeast extract broth (Gottlieb, supra.) and tyrosine agar (Shinobu, Mem. Osaka Univ., B. Nat. Sci., 7:1–76, 1958). Strain C-35,101 grows well on tomato paste oatmetal agar (Pridham et al., supra.) at 28° C. but does not grow at 50° C.

Members of the genus Streptomyces showing a hairy to spiny spore surface are cited by Shirling and Gottlieb, Intern. J. Systematic Bacteriol., 18:69–189, 279–392, 1968 and 19:391–512, 1969). These organisms do not produce a pH indicator pigment in diagnostic media. In such media, strain C-35,101 and variant 8 produce a single pH indicator pigment which is herein designated kundrymycin.

An organism that appears to be closely related to strain C-35,101 is *Streptomyces misawanensis* (Hamada et Okami) strain MA944-A5 producing aquayamycin (Sezaki et al., J. Antibiotics, Ser. A 21(2):91–97, February 1968). Kundrymycin and aquayamycin are related antitumor antibiotics, but differ in certain properties such as molecular weight. In addition, these actinomycetes differ morphologically; namely, the projections on the spore surface of C-35,101 are longer than those of strain MA944-A5. In view of these differences, strain C-35,101 is considered to be a new species and is given the name *Streptomyces metachromogenes* sp. n.

Kundrymycin has been produced by fermentation of strain C-35,101, including variant 8, grown on an agar slant medium consisting of 2 grams glucose, 20 grams oatmeal, 2 grams soy peptone, 20 grams agar, and one liter distilled water. After seven days of incubation at 28° C., spores were transferred to a 500 ml. Erlenmeyer flask with 100 ml. of vegetative medium consisting of 30 grams Cerelose (glucose monohydrate from Corn Products Sales Co., Englewood Cliffs, N.J., 10 grams Nutrisoy (soybean flour from Archer Daniels Midland Co., Minneapolis, Minn.), 10 grams Pharmamedia (cottonseed embryo meal from Traders Oil Mill Co., Fort Worth, Tex.), 3 grams $CaCO_3$ and one liter distilled water. The culture was incubated at 27° C. on a Gyrotory tier shaker (Model G53, New Brunswick Scientific Co., Inc., New Brunswick, N.J.) set at 212 revolutions per minute describing a two-inch diameter circle. After 48 hours, 4 ml. of vegetative culture was transferred to 100 ml. of production media such as shown in Table III, below.

These media were evaluated for production of antitumor activity against transplanted mouse tumors and Walker 256 carcinosarcoma with conditions as described above for preparation of vegetative inoculum, except that the shaker was set at 230 revolutions per minute and samples were taken from 72 to 168 hours. Productivity was evaluated when the highest dilution of clarified culture sample giving in vivo tumor inhibition was determined. Early trials indicated that glucose hydrate gave better activity than corn starch. Paired combinations of soybean flour, peanut meal, linseed meal, Pharmamedia, safflower meal, and Menhaden fish meal were tested in media containing 4% to 6% glucose hydrate and 0.5% $CaCO_3$. The best results were obtained with Medium 5 which gave antitumor activity at a 1/25 dilution of clarified broth.

TABLE III

Antitumor activity with kundrymycin production media

| | Production media | Amount, percent | Walker 256 carcinosarcoma tumor test [a][b] |
|---|---|---|---|
| 1 | Corn starch | 4.0 | 1/2 |
| | Peanut meal | 2.0 | |
| | $CaCO_3$ | 0.4 | |
| 2 | Glucose hydrate | 4.0 | 1/5 |
| | Pharmamedia | 1.0 | |
| | Peanut meal | 1.0 | |
| | $CaCO_3$ | 0.5 | |
| 3 | Glucose hydrate | 5.0 | 1/5 |
| | Pharmamedia | 2.0 | |
| | Safflower meal | 1.0 | |
| | $CaCO_3$ | 0.5 | |
| 4 | Glucose hydrate | 4.0 | 1/10 |
| | Menhaden fishmeal | 1.0 | |
| | Peanut meal | 2.0 | |
| | $CaCO_3$ | 0.5 | |
| 5 | Glucose hydrate | 6.0 | 1/25 |
| | Soybean flour | 3.0 | |
| | $CaCO_3$ | 0.5 | |

[a] Tests conducted with culture samples clarified by centrifugation.
[b] Highest active dilution giving 58% or greater tumor weight inhibition.

Variant 8 was used to produce kundrymycin in tank fermenters with Medium 5. A tank with ten gallons of production culture was agitated with an impeller speed of 375 revolutions per minute and air was supplied at 0.7 cubic feet per minute. A tank with 800 gallons of production culture was agitated with an impeller speed of 155 revolutions per minute and air was supplied at 75 cubic feet per minute. At 166 hours, kundrymycin yield was 4.2 mg./ml.

Samples of cultures for analysis are centrifuged to remove the mycelium. It has been found that the mycelium contains significant quantities of kundrymycin and that the amount of kundrymycin in the supernatant increases as the content in the mycelium increases. To estimate kundrymycin in both the mycelium and in the supernatant, cultures were shaken for 30 minutes with methanol in a volume ratio of 1:29. The methanol was removed by centrifugation, and the sediment was re-extracted twice with 15 ml.-portions of methanol. Accordingly, kundrymycin can be recovered from both the mycelium and the fermentation broth. Antitumor activity was measured with the intramuscularly-transplanted Walker 256 carcinosarcoma in rats (Talalay, Cancer Res., 12:834–837, 1952).

Antibiotic activity was measured by means of a cylinder-type agar diffusion assay. The assay organism was *Bacillus subtilis* ATCC 6633 seeded into Streptomycin Assay Agar with Yeast Extract (Baltimore Biological Laboratory, Baltimore, Md.). Assay plates were incubated at 30° C. for 18 hours.

The concentration of kundrymycin can be measured by colorimetric techniques based on the development of a blue color in alkaline methanolic solution and measurement of the color at a wave length of 548 millimicrons. The solubility of crystalline kundrymycin in methanol can be enhanced by using a small amount, e.g., up to about 20% by volume, of methylene chloride. In the analysis of crystalline material, the kundrymycin can be predissolved in a small volume of methylene chloride and then the resulting solution diluted with methanol. Although kundrymycin is unstable in alkaline solution, concentrations of about 10 to 50 $\mu$g./ml. can be read immediately after addition of alkali to give a linear curve with a correlation coefficient greater than 0.999.

Thin layer chromatography of culture extracts failed to give evidence of other pH indicator compounds that would interfere with a colorimetric assay. A preferred silica gel thin layer solvent system for kundrymycin consists of methanol: toluene: formic acid (95:5:0.5). To obtain a bioautograph, thin layer chromatograms were overlayed with Streptomycin Assay Agar with Yeast Extract seeded with *B. subtilis* ATCC 6633. After incubation for 18 hours at 30° C., a 1.25% aqueous solution of 2,3,5 - triphenyl 2H - tetrazolium chloride containing 1.25% glucose was sprayed on the surface of the agar. Areas containing *B. subtilis* growth became red; while zones of inhibition remained colorless. Five $\mu$g. of kundrymycin on a thin layer plate gave a yellow spot at Rf 0.78 that coincided with a zone of bacterial inhibition. Chromatography of culture samples showed evidence of other zones of inhibition; however, these zones were not investigated further.

Kundrymycin was isolated from a ten-gallon tank fermenter by the following procedure. Diatomaceous earth filter aid (3 kg.) was added to 15 liters of harvested broth and the mixture filtered on a 24-inch precoated Nutsche filter followed by water wash (8 liters) of the cake. The combined filtrate and wash (23 liters) was adjusted to pH 5.4 with 30% aqueous $H_2SO_4$ and extracted by agitation with 23 liters methylene chloride for ½ hour. The organic phase (16 liters) was separated, concentrated to 890 ml. and diluted with 2.67 liters of n-hexane to precipitate 9 grams of crude kundrymycin.

The cake from the broth filtration was stirred with 20 liters acetone for ½ hour and filtered on a 24-inch Nutsche filter, another 27 liters acetone being used as wash. The combined filtrate and wash were evaporated to 12 liters, at which point solids began to precipitate. The concentrate was diluted with 6 liters water, adjusted to pH 5.2 with 30% $H_2SO_4$, and extracted for ½ hour with 18 liters methylene chloride under agitation. The organic phase (16 liters) was evaporated to 600 ml. and diluted with 3.5 liters n-hexane to precipitate 72 grams of crude kundrymycin.

Crude solids (10 grams) were dissolved in 50 ml. boiling benzene, the volume reduced slightly, and the solution allowed to cool slowly to room temperature and then seeded if necessary. After standing overnight at 8° C., 9.1 grams of pure crystalline kundrymycin was collected.

The antibiotic, kundrymycin, when recrystallized from benzene, exists in a platelet crystalline form having an orange color which melts between 183° C. to 185° C. It is soluble in methanol, ethanol, dioxane, acetone, ethyl acetate, chloroform, methylene chloride, and hot benzene, and almost insoluble in water, carbon tetrachloride, and petroleum ether. In aqueous and alcoholic solutions, kundrymycin is a pH indicator which is orange at acid pH and blue-violet at basic pH.

Kundrymycin is very stable in neutral solution at a concentration of 1 mg./ml. of normal methanol. No loss of activity could be detected by antibacterial assay after 6 weeks at 37° C. Solutions of kundrymycin are unstable below pH 5 and above pH 8.

Figure 1:
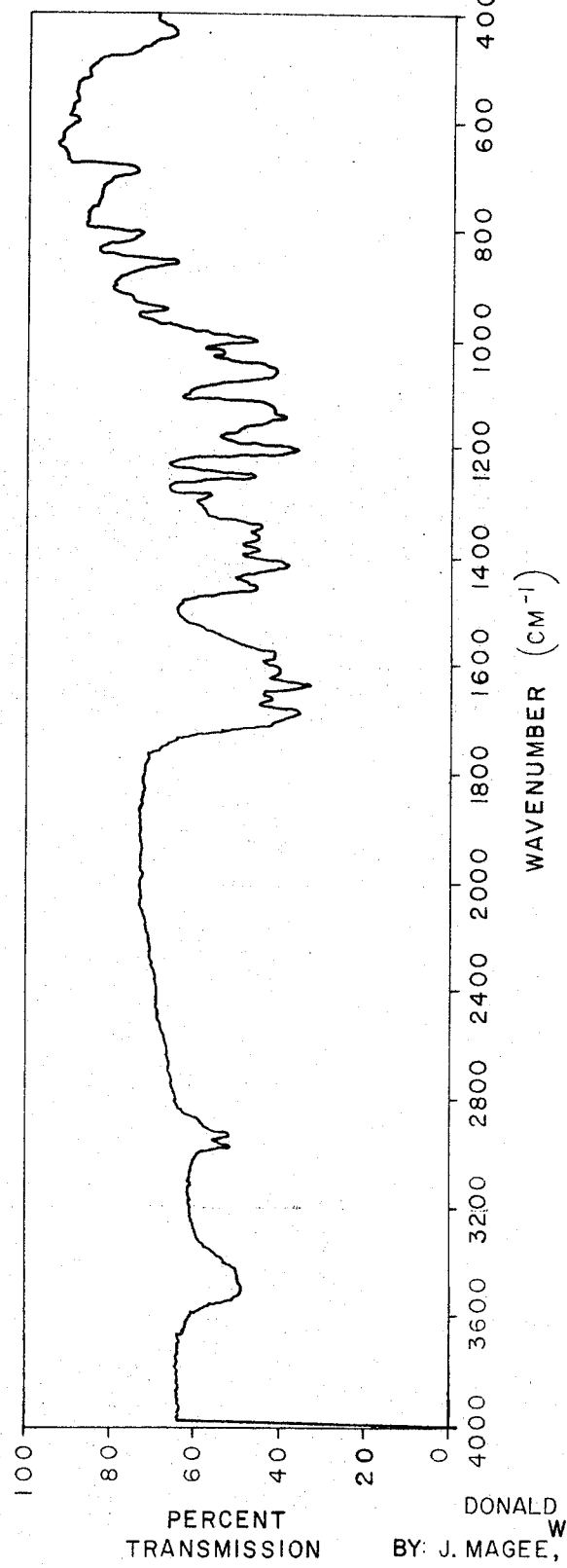

The ultraviolet and visible spectra show absorption peaks (0.1 N HCl in ethanol) at 214 m$\mu$ ($a=43.5$), 241 m$\mu$ ($a=44.0$), 282 m$\mu$ ($a=24.5$), and 442 m$\mu$ ($a=7.05$). Using 0.1 N NaOH in ethanol, there was a slight shift to 229 m$\mu$ ($a=34.8$), 243–249 (shoulder) ($a=29.3$), 278–286 m$\mu$ (shoulder) ($a=21.0$), and 548 m$\mu$ ($a=6.35$). The IR spectrum is shown in FIG. 1. The nuclear magnetic resonance spectrum indicates the presence of 50 protons. The optical rotation is $(\alpha)_D^{25}-117.8°$, $(\alpha)_D^{25}-128.8°$ (dioxane).

Osmometric determination of the molecular weight of kundrymycin gave a value of 894 in $CHCl_3$, and elemental analysis suggested a molecular formula of $C_{45}H_{50}O_{18}$ (mol. wt. 878.9). There were no other elements or ash.

The calculated analysis of kundrymycin is carbon 61.52% and hydrogen 5.70%. Actual analysis showed the carbon content to be 61.69% and 61.41% and the hydrogen content to be 5.87% and 5.70%.

The in vitro minimum inhibitory concentration (MIC) of kundrymycin for a number of microorganisms was determined by the tube dilution procedure described by Bradner et al., Antimicr. Agents and Chemoth, 1966: 613–618, 1967. Some gram-positive organisms, shown in Table IV, were sensitive to the antibiotic; gram-negative bacteria, yeasts, and protozoa were generally insensitive.

Kundrymycin was tested for its ability to induce bacteriophage production in the lysogenic strain of *Escherichia coli* W1709. There was no evidence of induction at 12.5 $\mu$g./ml. and toxicity to the host organism was observed at 50 $\mu$g./ml.

Tube dilution protein tests to determine cytotoxic effects of kundrymycin on HeLa cells in tissue culture gave a 50% end-point ($ED_{50}$) of 10 $\mu$g./ml. (Bradner et al., supra.).

TABLE IV.—ANTIMICROBIAL SPECTRUM OF KUNDRYMYCIN

| Test organism: | Minimum inhibitory concn. ($\mu$g./ml.) |
|---|---|
| Bacteria: | |
|     *Staphylococcus aureus* A–9537 | 0.2 |
|     *Mycobacterium bovis* BCG | 25.0 |
|     *Escherichia coli* A–15119 | >50.0 |
|     *Pseudomonas aeruginosa* A–9843 | >50.0 |
|     *Proteus mirabilis* A–9900 | >50.0 |
|     *Streptococcus faecalis* A–9536 | 0.05 |
|     *Klebsiella pneumoniae* A–9977 | >50.0 |
|     *Salmonella enteritidis* A–9531 | >50.0 |
| Fungi: | |
|     *Candida albicans* A–9540 | 50.0 |
|     *Trichophyton mentagrophytes* A–9870 | >50.0 |
|     *Microsporum canis* A–9872 | >50.0 |
|     *Cryptococcus neoformans* A–15053 | >40.0 |
|     *Histoplasma capsulatum* A–15056 | >50.0 |
| Protozoa: | |
|     *Trichomonas vaginalis* A–20074 | 5.0 |
|     *Trichomonas foetus* A–20075 | >10.0 |

The acute interperitonial $LD_{50}$ of kundrymycin was determined in female mice. During a 35-day observation period, 19 mice died; 17 on Day, and one each on Days 2 and 11. Therefore, the antibiotic appears generally free of delayed toxic effects.

The effect of kundrymycin treatment was studied in several transplanted rodent tumor systems. Details of methods used have been previously described for mouse tumors Sarcoma 180 (S–180) in Cancer Res., 22:167–173, 1962, and in Cancer Chemoth. Reports, 22:1–66, 1962. The results obtained with mouse tumors are shown in Table V, below. No effect was found on 2 leukemias (L–1210 and P–388) and inhibition only at a toxic dose (⅔ deaths) on Sarcoma 180. A type of rat tumor, WM which originally responded to material in crude fermentation broths, was more sensitive to treatment with pure kundrymycin. A typical dose-response titration is shown in Table VI, below. If the $LD_{10}$ is considered the maximum tolerated dose (MTD) and the lowest dose-giving tumor inhibition ($P \leqq .05$) the minimum effective dose (MED) the therapeutic ratio, MTD/MED=3.

except at 230 r.p.m. Peak activity is reached in 6 to 7 days.

Whole broth (8 to 8.5 liters, pH 7.5) is filtered through a milk filter (cheesecloth backed with gauze) to give 6 liters of broth liquor. The last is stirred with 6 liters of methylene chloride at pH 5.4 for 30 minutes, the phases are separated, and the organic phase concentrated to near dryness. Dilution with excess Skellysolve B gives 2.0 grams of orange-yellow, amorphous solid.

The mycelium is suspended in just enough water to make it fluid and the pH of the mixture adjusted to 5.4 with hydrochloric acid. Acetone (4 volumes) is added and the mixture stirred for 30 minutes. Following filtration, acetone is evaporated and more water added to a total volume of 2.5 liters. The aqueous mixture is extracted with 2.5 liters of methylene chloride and the or- TABLE V
Effect of kundrymycin on transplanted mouse tumors

| Daily dose, mg./kg. | L-1210 (ascitic) | | | P-388 (ascitic) | | | S-180 (solid) | | |
|---|---|---|---|---|---|---|---|---|---|
| | Avg. wt.* difference (T-C, g.) | T/C percent MST | Survivors, day 5 | Avg. wt.* difference (T-C, g.) | T/C percent MST | Survivors, day 6 | Avg. wt. difference (T-C, g.) | T/C av. diam. | Survivors, day 8 |
| 8 | 0 | 107 | 6/6 | −0.5 | 105 | 6/6 | −4.6 | .44 | 3/5 |
| 4 | +1.0 | 100 | 6/6 | −1.5 | 100 | 6/6 | −1.4 | .80 | 5/5 |
| 2 | +1.0 | 100 | 6/6 | −1.0 | 105 | 6/6 | −0.9 | .77 | 5/5 |
| 1 | −1.5 | 100 | 6/6 | −0.5 | 100 | 6/6 | −1.0 | .98 | 5/5 |

* Evaluation: T/C percent MST=Median survival time in days. Treated/control × 100. A T/C≧125 considered significant prolongation of survival with L-1210 and P-388. Average diameter measurements T/C≦.75 considered significant tumor inhibition with S-180.

Note.—Treatment schedules: All injected once daily i.p. in 0.5 ml. volume starting Day 1. L-1210, P-388, S-180=13, 10, and 7 injections, respectively.

TABLE VI
Effect of kundrymycin on Walker 256 carcinosarcoma

| Daily dose, Mg./Kg. | Avg. wt. difference, T-C, g. | Tumor weight treated/control, g. | T/C index | Effect | Survivors, Day 7 |
|---|---|---|---|---|---|
| 8 | −18.8 | 0.9/7.5 | .12 | + | 7/10 |
| 6 | −15.6 | 1.5/7.5 | .20 | + | 9/10 |
| 4 | −10.4 | 3.0/7.5 | .40 | + | 10/10 |
| 3 | −8.4 | 3.0/7.5 | .40 | + | 10/10 |
| 2 | −2.4 | 4.6/7.5 | .61 | ± | 10/10 |
| 1.5 | −1.3 | 5.6/7.5 | .75 | − | 10/10 |
| 1 | −0.7 | 5.8/7.5 | .77 | − | 10/10 |
| 0.75 | −1.3 | 6.9/7.5 | .92 | − | 10/10 |

Note.—Treatment schedule: Once daily, i.p., 4 injections Days 3–6, 2 ml. volume. Evaluation: +=Tumor inhibition P≦.01. ±=Tumor inhibition P≦.05. −=No tumor inhibition.

Chemically, kundrymycin appears to be a polynuclear quinone indicator antibiotic based on the physical and chemical measurements reported. It can be differentiated from other non-nitrogen containing indicator antibiotics on the basis of molecular weight, empirical analysis, melting point and/or energy absorption spectra.

Example 1

*Streptomyces metachromogenes* from a lyophilized culture is transferred to an agar slant prepared from a mixture of 2 grams of glucose, 20 grams of oatmeal, 2 grams of soy peptone, 20 grams of agar, and sufficient water to bring the total volume to one liter. After incubation at about 28° C. for seven days, the slant culture is suspended in water. The suspension is transferred to 100 ml. of vegetative medium from 30 grams of cerelose (glucose hydrate), 10 grams of soybean metal, 10 grams of Pharmamedia (Traders Oil Mill Co., Fort Worth, Tex.), and 3 grams of $CaCO_3$ made up to one liter with distilled water.

This culture is incubated at about 27° C. in a 500 ml. Erlenmeyer flask on a Gyrotary shaker (Model G53, New Brunswick Scientific Co., Inc., New Brunswick, N.J.) set at 212 r.p.m. After 48 hours, 4 ml. of vegetative culture is transferred to 100 ml. of production medium from 50 grams of cerelose, 30 grams of peanut meal, 10 grams of fish meal, and 5 grams of $CaCO_3$ made up to one liter with distilled water. Incubation is carried out as above, ganic phase worked up as above to give 9.4 grams crude kundrymycin.

A short silicic acid column is prepared from a slurry of silica gel in 20 ml. of ethyl acetate. Through this is passed a solution of 8 grams of crude material in ethyl acetate followed by rinsing, a total of 250 ml. of solvent being used. The combined effluent and rinses is evaporated to dryness.

The residue is taken up in 75 ml. to 85 ml. of boiling benzene, and then allowed to cool slowly. Seeding is initiated at 40° C. to 50° C. (if necessary). The mixture is then placed at 8° C. overnight to complete crystallization and the solids collected to give 5.05 grams of pure kundrymycin.

Example 2

Vegetative medium prepared as in Example 1 is used to inoculate 10 gallons of production medium containing 6% cerelose, 3% soy bean meal, and 0.5% $CaCO_3$. A fermenter so charged is agitated at 375 r.p.m. under aeration at 3.7 cubic feet per minute (15 lbs. pressure) and at 81° F. for 180 hours.

To the harvested broth (15 liters) is added 3 kg. diatomaceous earth filter aid and the mixture filtered on a 24-inch precoated Nutsche followed by water wash (8 liters) of the cake. The combined filtrate and wash (23 liters) is adjusted to pH 5.4 with 30% aqueous $H_2SO_4$ and extracted by agitation with 23 liters of methylene chloride for ½ hour. The organic phase (16 liters) is separated, concentrated to 890 ml. and diluted with 2.67 liters of Skellysolve B to precipitate 9 grams crude kundrymycin.

The cake from the broth filtration is stirred with 20 liters of acetone for ½ hour and filtered on a 24-inch Nutsche, another 27 liters of acetone being used as wash. The combined filtrate and wash are evaporated to 12 liters, at which point solids begin to precipitate. The concentrate is diluted with 6 liters of water, adjusted to pH 5.2 with 30% $H_2SO_4$, and extracted for ½ hour with 18 liters of methylene chloride under agitation. The organic phase (16 liters) is evaporated to 600 ml. and diluted with 3.5 liters of n-hexane to precipitate 72 grams of crude kundrymycin.

Yields from broth and mycelial extraction may vary from one run to another, but total yields are more constant. Thus, in another run 20 grams crude kundrymycin were obtained from liquor but only 40 grams from the mycelium.

Crude solids (10 grams) are dissolved in 50 ml. of boiling benzene, the volume reduced slightly, and the solution allowed to cool slowly to room temperature and then seeded if necessary. After standing overnight at 8° C., 9.1 grams of pure crystalline kundrymycin is collected, equivalent to that prepared in Example 1.

We claim:

1. A composition designated as kundrymycin, characterized by solubility in methanol, ethanol, dioxane, acetone, ethyl acetate, chloroform, methylene chloride, and hot benzene; insolubility in water, carbon tetrachloride, and petroleum ether; exhibiting in the pure state an orange-colored platelet crystalline form, melting between 183° C. and 185° C.; a molecular weight by osmometric determination of 894 in chloroform; an elemental analysis as follows: 61.69% to 61.41% carbon and 5.87% to 5.70% hydrogen; an ultraviolet absorption spectrum in acidic ethanol exhibiting maximum at 214 m$\mu$, 241 m$\mu$, 282 m$\mu$, and 442 m$\mu$; and an infrared absorption spectrum as shown in the drawing.

2. A process for preparing a biologically active substance designated as kundrymycin which comprises cultivating *Streptomyces metachromogenes* ATCC 21,440 in aqueous carbohydrate solution containing a nitrogenous nutrient until a substantial antibiotic activity is produced in said solution.

3. The process of claim 2, wherein the kundrymycin is recovered from the cultivation media.

References Cited

Miller: Pfizer Handbook of Microbial Metabolites, McGraw-Hill Book Co., Inc., New York, N.Y., 1961, p. 452.

JEROME D. GOLDBERG, Primary Examiner

U.S. Cl. X.R.

195—80